(12) United States Patent
Ishida

(10) Patent No.: US 8,861,042 B2
(45) Date of Patent: Oct. 14, 2014

(54) IMAGE READING METHOD, IMAGE READING SYSTEM, AND IMAGE READING APPARATUS

(75) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 13/159,228

(22) Filed: Jun. 13, 2011

(65) Prior Publication Data

US 2012/0008176 A1    Jan. 12, 2012

(30) Foreign Application Priority Data

Jul. 12, 2010 (JP) ................................ 2010-158262

(51) Int. Cl.
*H04N 1/04* (2006.01)
*H04N 1/387* (2006.01)
*H04N 1/46* (2006.01)
*H04N 1/00* (2006.01)

(52) U.S. Cl.
CPC ...... *H04N 1/0044* (2013.01); *H04N 2201/0098* (2013.01); *H04N 2201/0081* (2013.01); *H04N 2201/0416* (2013.01); *H04N 1/3872* (2013.01); *H04N 2201/0094* (2013.01); *H04N 1/00442* (2013.01); *H04N 1/00241* (2013.01)

USPC ............................ 358/474; 358/505; 358/497

(58) Field of Classification Search
CPC combination set(s) only.
See application file for complete search history.

(56) References Cited

U.S. PATENT DOCUMENTS

| 2006/0072154 A1* | 4/2006 | Kim ............................. 358/1.15 |
| 2007/0013974 A1* | 1/2007 | Hattori .......................... 358/486 |
| 2010/0103474 A1* | 4/2010 | Oiwa et al. .................... 358/461 |
| 2010/0299621 A1* | 11/2010 | Piehler et al. ................. 715/764 |

FOREIGN PATENT DOCUMENTS

| JP | 10-143645 | 5/1998 |
| JP | 2003-219085 | 7/2003 |

* cited by examiner

*Primary Examiner* — Thierry L Pham
(74) *Attorney, Agent, or Firm* — Fitzpatrick, Cella, Harper & Scinto

(57) ABSTRACT

The purpose of this invention is to facilitate visually grasping the progress of reading during reading of a plurality of images. To accomplish this, when placing a plurality of images on an original table and scanning and reading them, display is made to allow a user to grasp which image on a preview screen corresponds to the image under scan. In addition, after the start of main scan, the user can designate an image on the preview screen and cancel scan of the image and change the scan sequence.

20 Claims, 11 Drawing Sheets

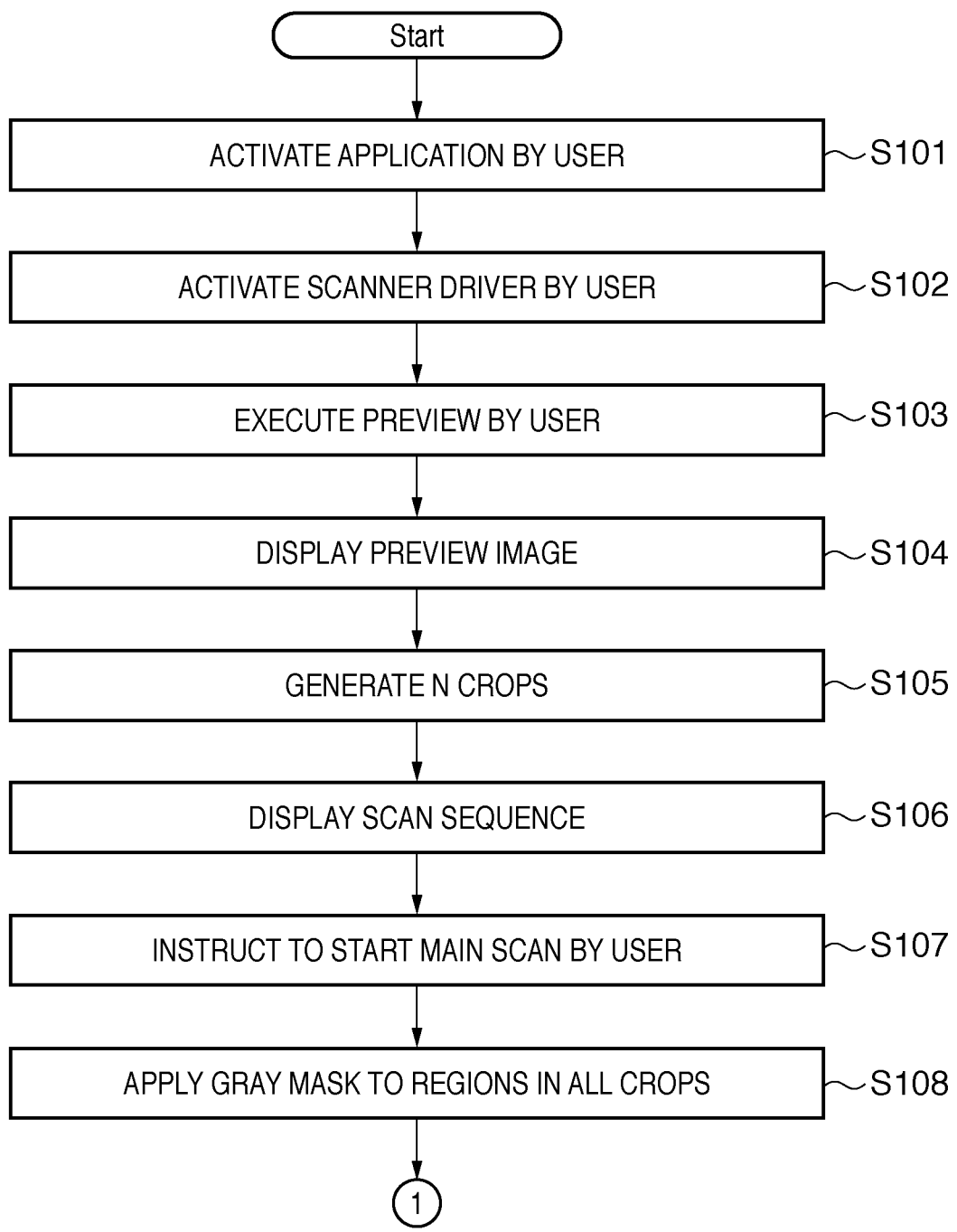

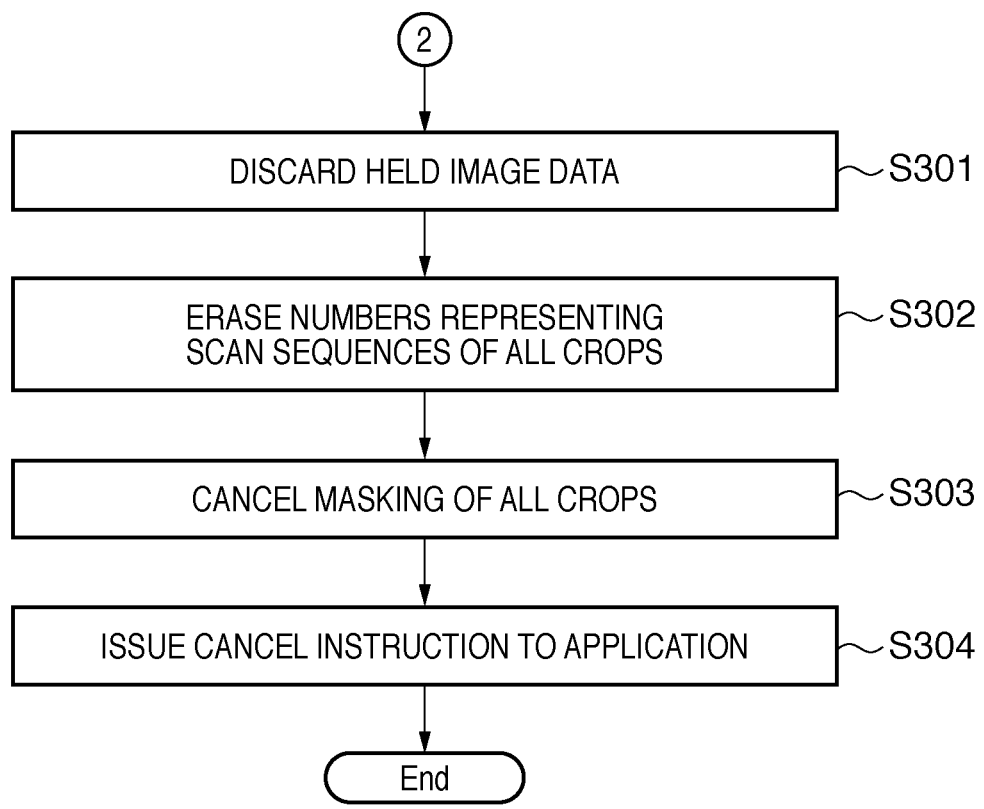

IMAGE READING METHOD, IMAGE READING SYSTEM, AND IMAGE READING APPARATUS

BACKGROUND OF THE INVENTION

1. Field of the Invention

The present invention relates to an image reading method, an image reading system, and an image reading apparatus. Particularly, the present invention relates to an image reading method, an image reading system, and an image reading apparatus, which allow a user to specifically grasp the progress of scan when scanning and reading a plurality of originals.

2. Description of the Related Art

Conventionally, many of scanner drivers installed in image reading apparatuses or host computers connected to them display a progress bar on the screen to indicate the progress of original reading. When reading a plurality of originals, the dialogue with the progress bar displays the ordinal number of the original that is being read. The dialogue with the progress bar includes a cancel button. When the user depresses the cancel button, the subsequent reading is wholly canceled.

For example, Japanese Patent Laid-Open No. 2003-219085 discloses an arrangement that allows a user to specifically grasp the progress when reading a plurality of originals. "Progress" is defined as the total number of read originals or the remaining number of originals to be read. For example, three originals are assumed to be read. During scanning/reading of the second original, "two more images to scan remain" is displayed, and a progress bar representing the progress of reading of the second original is also displayed.

Japanese Patent Laid-Open No. 10-143645 discloses an arrangement that reduces read images and sequentially displays them on the monitor screen during execution of the reading operation of the scanner. The reduction enables to display even a larger image on the monitor screen. In addition, since the read images are sequentially displayed, the user can grasp the progress of reading by the images.

In the above-described related arts, when placing a plurality of originals on the original table and reading them, the user can grasp the ordinal number of the current original or the remaining number of originals. In the above-described related arts, however, the user cannot visually grasp which read original on the preview screen corresponds to the original which is being read. Hence, when depressing the cancel button in the dialogue of the progress bar, the user cannot know which original has been canceled in reading.

SUMMARY OF THE INVENTION

Accordingly, the present invention is conceived as a response to the above-described disadvantages of the conventional art.

For example, an image reading method, an image reading system, and an image reading apparatus according to this invention are capable of facilitating visually grasping the progress of reading during reading of a plurality of image originals.

According to one aspect of the present invention, there is provided an image reading method of scanning at least one original and reading an image, comprising: pre-scanning the at least one original; displaying a plurality of crops on a screen by generating, from an image obtained from pre-scanning the at least one original, the plurality of crops corresponding to a reading target image for main scan and; main-scanning an image corresponding to the plurality of crops; and controlling to change a state of display of the plurality of crops in accordance with progress of the main scan.

According to another aspect of the present invention, there is provided an image reading system and image reading apparatus to which the above method is applied.

According to still another aspect of the present invention, there is provided a non-transitory computer-readable storage medium storing a computer-executable program, the computer-executable program comprising the steps recited in the above method.

The invention is particularly advantageous since the user can easily visually grasp the progress of reading of a plurality of images on the screen. It is also possible to change the reading operation by canceling reading after grasping the image under scan, continuing the subsequent image reading even after the cancel, or excluding an image yet to be read from the reading target.

Further features of the present invention will become apparent from the following description of exemplary embodiments (with reference to the attached drawings).

BRIEF DESCRIPTION OF THE DRAWINGS

FIG. 3 is a flowchart illustrating image reading processing according to the first embodiment of the present invention.

FIG. 5 is a flowchart illustrating processing when the whole cancel function is executed.

DESCRIPTION OF THE EMBODIMENTS

An exemplary embodiment of the present invention will now be described in detail in accordance with the accompanying drawings. Note that the arrangements disclosed in the following embodiments are merely illustrative, and the present invention is not limited to the illustrated arrangements.

Figure 1:
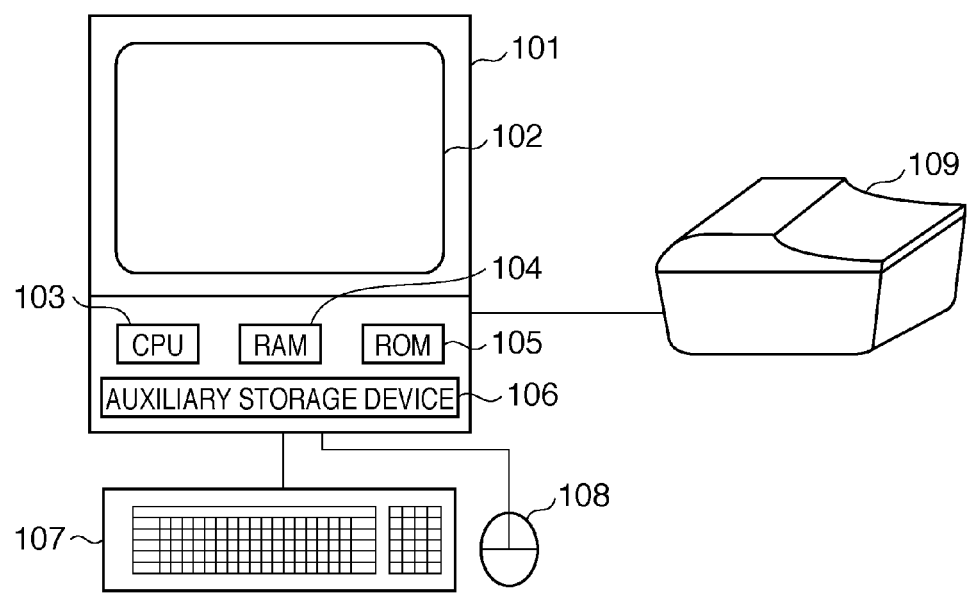
FIG. 1 is a view showing the hardware configuration of a representative image reading system according to the present invention.

FIG. 1 is a view showing the hardware configuration of an image reading system (to be referred to as a system hereinafter) according to an exemplary embodiment of the present invention. As shown in FIG. 1, this system includes a host computer (to be referred to as a host hereinafter) 101 and an image reading apparatus 109 connected to it. The image reading apparatus 109 can be an MFP (Multi Function Peripheral) including a printer unit, a scanner unit, and a monitor unit, or a single-function flat-bed scanner device. In either case, the image reading apparatus can perform pre-scan.

The host 101 issues an operation command to the image reading apparatus 109 and acquires image data from it. The host 101 includes a monitor 102 that displays the UI (User Interface) of an application or a scanner driver and its execution state (to be described later), and a CPU 103 which executes the application or the scanner driver. The host 101 also includes a ROM 105 that stores basic software (OS) such as BIOS, a RAM 104 that temporarily stores software such as the application and the scanner driver and data, and an auxiliary storage device 106 such as a hard disk. The host 101 also includes input devices such as a keyboard 107 and a pointing device 108.

Figure 2:
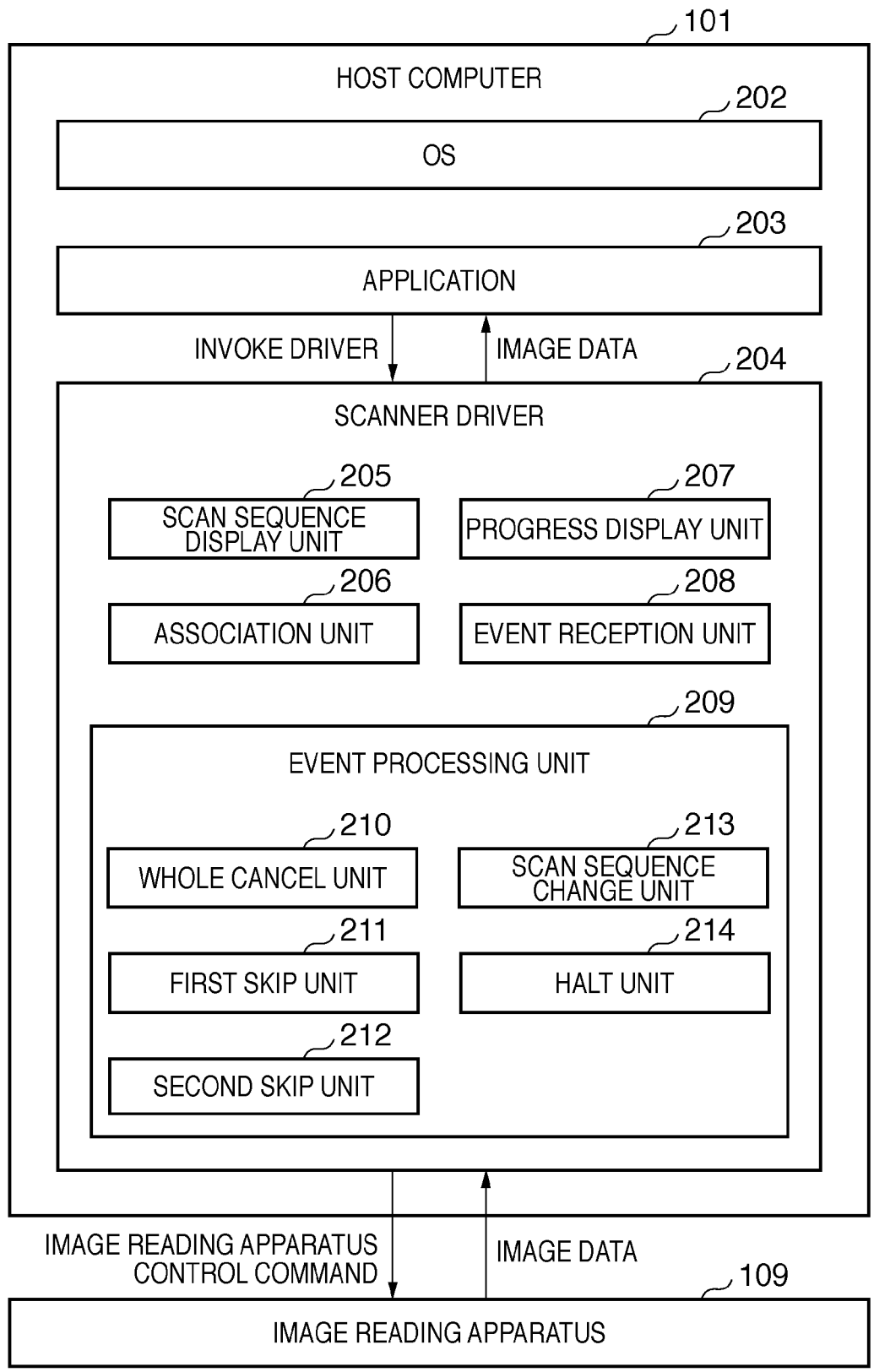
FIG. 2 is a block diagram showing the software configuration of the image reading system shown in FIG. 1.

FIG. 2 is a block diagram showing the software configuration of the system explained with reference to FIG. 1. The host 101 stores an OS 202, an application 203, and a scanner driver 204. The user activates the scanner driver 204 using the application 203, and the scanner driver 204 issues an operation command to the image reading apparatus 109, thereby obtaining image data from it. In this embodiment, the scanner driver 204 includes a scan sequence display unit 205, an association unit 206, a progress display unit 207, an event reception unit 208, and an event processing unit 209, as shown in FIG. 2. The event processing unit 209 includes a whole cancel unit 210, a first skip unit 211, a second skip unit 212, a scan sequence change unit 213, and a halt unit 214.

In the following description, a region segmented automatically or manually from a preview image will be referred to as a crop. One or a plurality of crops may exist on one image original (printing medium) depending on the segmentation method or the relationship between the image and the printing medium with the image printed thereon.

The scan sequence display unit 205 has a function of displaying a number representing the scan sequence of each crop. Each number representing the scan sequence may be displayed adjacent to a corresponding crop on the preview screen or displayed in a dedicated text box prepared in the UI of the scanner driver 204. When the numbers are displayed adjacent to the crops that overlap, it is difficult to discern the crop indicated by each number representing the scan sequence. Hence, the numbers and the crops, which are connected by lines, may explicitly be displayed.

The association unit 206 has a function of associating the current crop under scan with the crop on the preview screen.

The progress display unit 207 has a function of displaying the progress of image original reading using regions on the preview screen or crop frames.

In the method using regions on the preview screen, when the user instructs to start scan, the scanner driver 204 masks the entire preview screen or the screen in all crop frames or inverts the brightness of the screen, thereby performing color conversion. When starting receiving image data from the image reading apparatus, the scanner driver 204 compares the size of image data that is currently being received for the crop with the size of image data to be finally received for the crop. The scanner driver 204 then calculates the current percentage of the received image data. The color of the screen in the crop is returned back to that before the color conversion by the percentage. In the first embodiment to be described later, gray masking is performed as the color conversion. The ratio of the scanned image may be calculated, and the masking may be canceled by that ratio in the above-described way. Alternatively, the gray masking may be canceled by one line each time one line scan is completed.

On the other hand, in the method using crop frames, the crop frame under scan is enhanced by, for example, expressing the current crop under scan by a bold dotted line and other crops by thin lines, thereby allowing the user to grasp the current crop under scan. Instead of enhancing only the crop frame under scan, already scanned crop frames may be displayed in gray, and the crop frame to be scanned next may be expressed by a bold line. The expression of crop frames is changed in this way in accordance with the progress of scan of each crop, thereby enabling the user to grasp the progress of scan. In the second embodiment to be described later, the method using crop frames will be exemplified.

The event reception unit 208 has a function of receiving a user action for each crop. In the first embodiment to be described later, the event reception unit 208 receives a user's click or double click action on a crop sensed by a pointing device. Instead, a dedicated button may be provided in the UI of the scanner driver 204 so that the event reception unit 208 receives an event that occurs upon depressing the button.

The whole cancel unit 210 has a function of canceling the crop under scan and all crops to be subsequently scanned. When the whole cancel unit 210 is executed, the scanner driver 204 returns a cancel instruction in response to an image transfer request from the application 203. Upon receiving the cancel instruction from the scanner driver 204, the application 203 stops requesting the scanner driver 204 to perform subsequent scan in many cases even if a crop yet to be scanned remains.

For this reason, when the whole cancel unit 210 causes the scanner driver 204 to issue the cancel instruction to the application 203, the subsequent scan is wholly canceled. If the application 203 cancels only the current crop and issues an image transfer request for the next crop, the scanner driver 204 may continuously return the cancel instruction to cancel all crops.

The first skip unit 211 has a function of canceling the crop under scan and continuing the subsequent scan. As described above, many of the applications 203 end the scan upon receiving the cancel instruction from the scanner driver 204. For this reason, when the cancel instruction is issued to the application 203 at the time of execution of the first skip unit 211, the subsequent scan is wholly canceled.

In this embodiment, instead of sequentially transferring scanned image data to the application 203, the image data is not transferred to the application 203 but held by the scanner driver 204 until the scan of one crop has ended. When the first skip unit 211 is executed, the image data held so far is discarded, and the scan of the next crop starts. On the other hand, if the first skip unit 211 is not executed, and the scanner driver 204 has acquired all image data of one crop, the held image data of one crop is transferred to the application 203. The number representing the scan sequence of the crop for which the first skip unit 211 has been executed disappears, and the scan sequence numbers of the crops to be subsequently scanned are decremented by one.

The second skip unit 212 has a function of excluding a crop yet to be read from the scan target after the start of scan. After the start of scan, the user can designate a crop yet to be scanned on the preview screen and exclude it from the scan target. The scanner driver 204 holds scan settings such as the reading resolution for each of the plurality of crops, and issues a scan instruction to the image reading apparatus based on the settings. When the second skip unit 212 is executed, the scanner driver 204 does not issue, to the image reading apparatus, the scan instruction for the crop for which the second skip unit 212 has been executed. The number representing the scan sequence of the crop for which the second skip unit 212 has been executed disappears, and the scan sequence numbers of the crops to be subsequently scanned are decremented by one.

The scan sequence change unit 213 has a function of changing the scan sequence of each crop after the start of scan. As for the detailed method, the user can change the sequence by setting the scanner driver 204. For example, the user may do the setting such that a crop whose scan sequence has been changed is scanned finally or next to the current crop under scan. Alternatively, the user may designate two crops to transpose their sequences. The scan sequence change is possible only for crops yet to undergo the scan operation. The numbers representing the scan sequences are also changed.

The halt unit 214 has a function of canceling the crop under scan and the subsequent scan and, when scanning next time, scanning the preceding crop under scan and the subsequent crops, which are sequenced from 1. When the halt unit 214 is executed, the scanner driver 204 issues the cancel instruction to the application 203 to wholly cancel the crop under scan and subsequent crops yet to be scanned. At this time, the scanner driver 204 stores, as a history, the crops that have not been transferred to the application 203.

When the scan is temporarily canceled by the halt unit 214, the scanner driver 204 may end or not, which can freely be changed by setting the scanner driver 204. When the scanner driver 204 is ended, out of the precedent crops, only the crops that have not been transferred to the application 203 are displayed on the preview screen while being sequenced from 1 at the time of next activation of the scanner driver 204. On the other hand, out of the precedent crops, the crops that have already been transferred to the application 203 are displayed without being cropped. This also applies to the case in which the scanner driver 204 is not ended. Once the user has halted the scan, the subsequent scan operation ends. After that, the crops that have not been transferred to the application 203 are displayed on the preview screen while being sequenced from 1. When the scan starts, only the crops that have not been transferred to the application 203 in the preceding scan are scanned and transferred to the application 203.

Embodiments of image original reading processing in the system having the above-described hardware and software configurations will be described next.

[First Embodiment]

In the first embodiment, image reading using a 35-mm sleeve having six frames (frames A to F) will be described with reference to the flowcharts of FIGS. 3 to 7 and the display screen shown in FIGS. 8A to 9B.

The user places one 35-mm sleeve on the original table of the image reading apparatus 109, activates the application 203 (S101), and activates the scanner driver 204 of the target image reading apparatus (S102). When the user executes preview (S103), the image reading apparatus performs pre-scan and displays a thus obtained preview image in the preview region (S104).

Figure 8A:
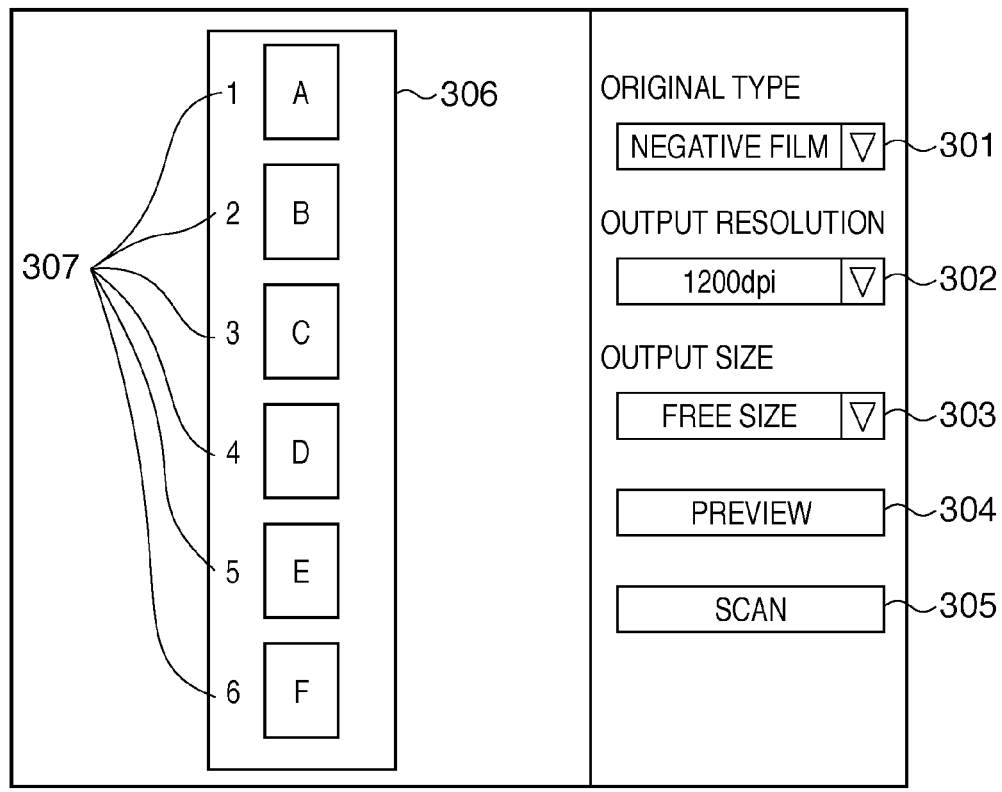
FIG. 8A is a view showing the UI of a scan driver.

FIG. 8A shows a display screen serving as the UI (User-Interface) of the scanner driver 204. On the UI of the scanner driver 204, the user sets an original type 301, an output resolution 302, and an output size 303 and depresses a preview button 304 to execute preview. Image data obtained by the preview is displayed in a preview region 306. Note that in FIG. 8A, reference numeral 305 denotes a main scan button to be used to start main scan; and 307, numbers representing the scan sequences.

The scanner driver 204 detects N crops from the preview image (S105). Since the 35-mm film sleeve exemplified here has six frames, N=6. When the crops are generated, the scan sequence display unit 205 displays the numbers representing the scan sequences (S106). When the numbers representing the scan sequences are displayed, the user depresses the main scan button 305 to start main scan (S107). When the main scan starts, the regions in all crops are masked gray (S108).

Figure 8B:
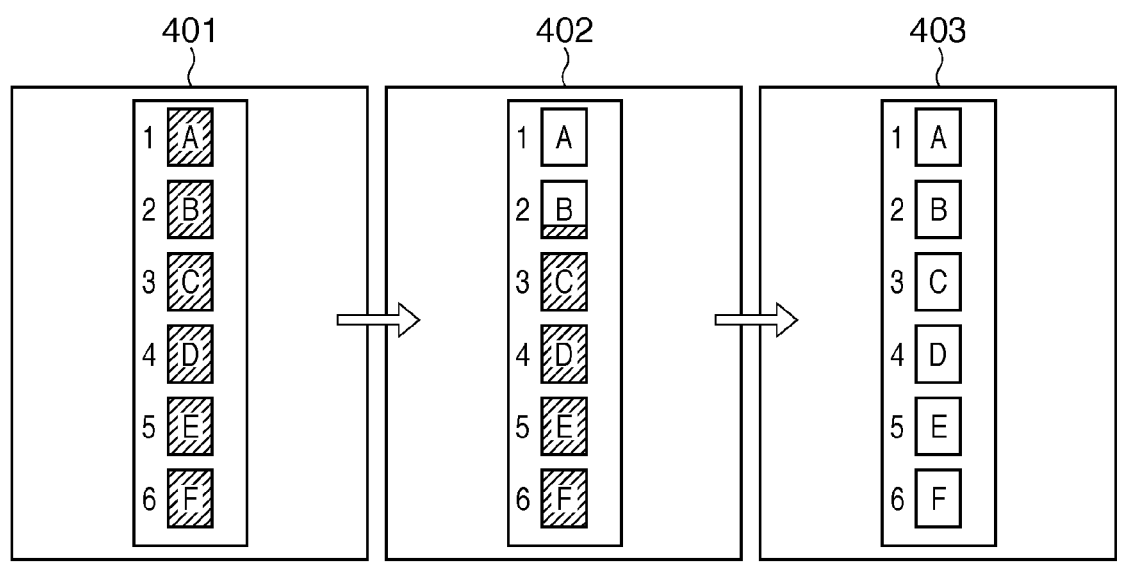
FIG. 8B is a view showing the progress of image reading using regions in crops.

FIG. 8B is a view showing states from execution of main scan to the end of scan of all crops. With the process of step S108, all crop frames are masked gray, as indicated by 401. Reference numeral 402 indicates a state in which the frame A has been scanned, and the frame B is being scanned. Reference numeral 403 indicates a state in which all crops have been scanned. Masking of all crops is canceled to return the display to the original preview image.

Note that in this embodiment, the scanner driver 204 detects the frames and generate the crops. However, the user may manually generate crops using the pointing device 108 or the like.

Figure 4A:
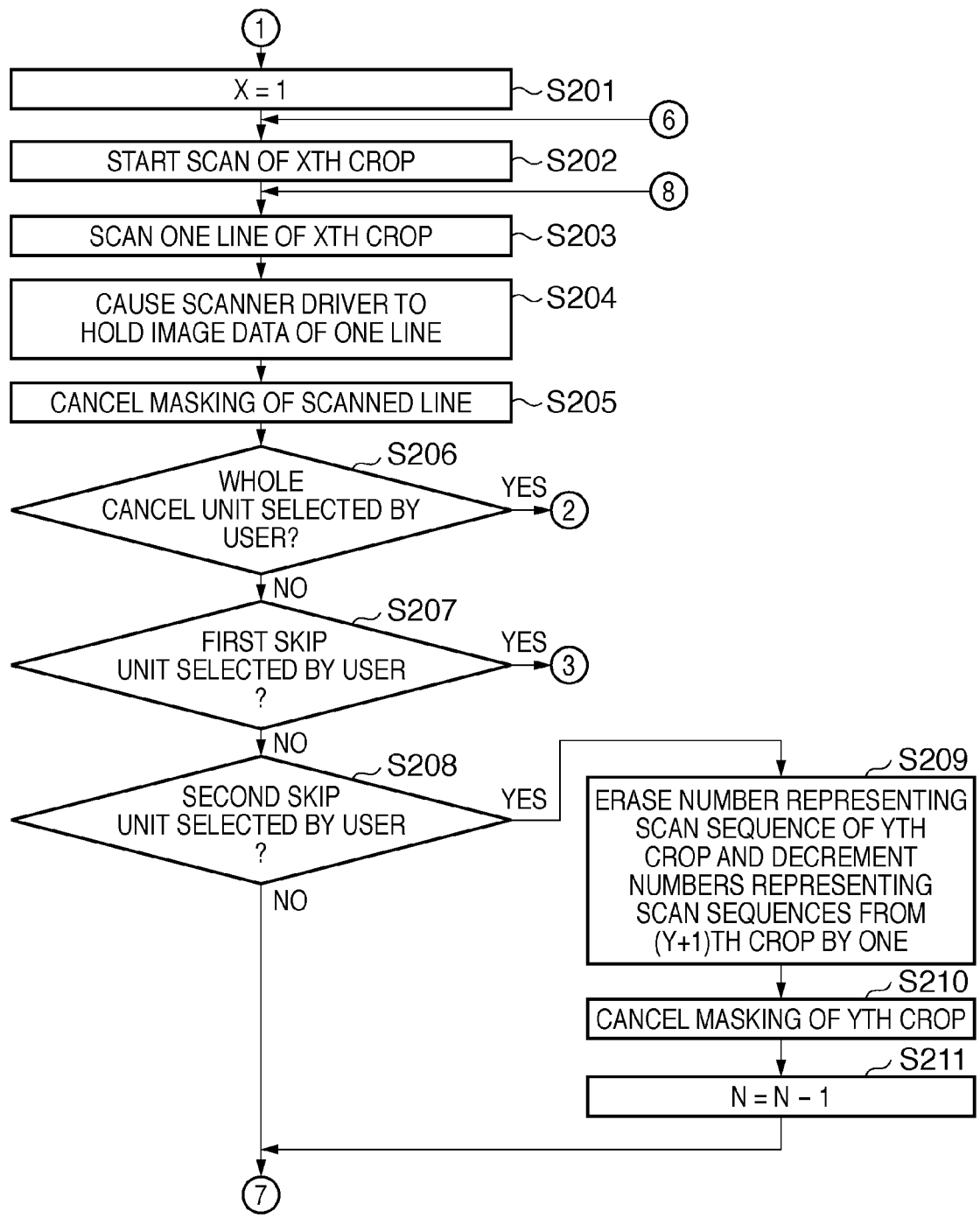
FIGS. 4A and 4B are flowcharts illustrating image reading processing according to the first embodiment of the present invention.
Figure 4B:
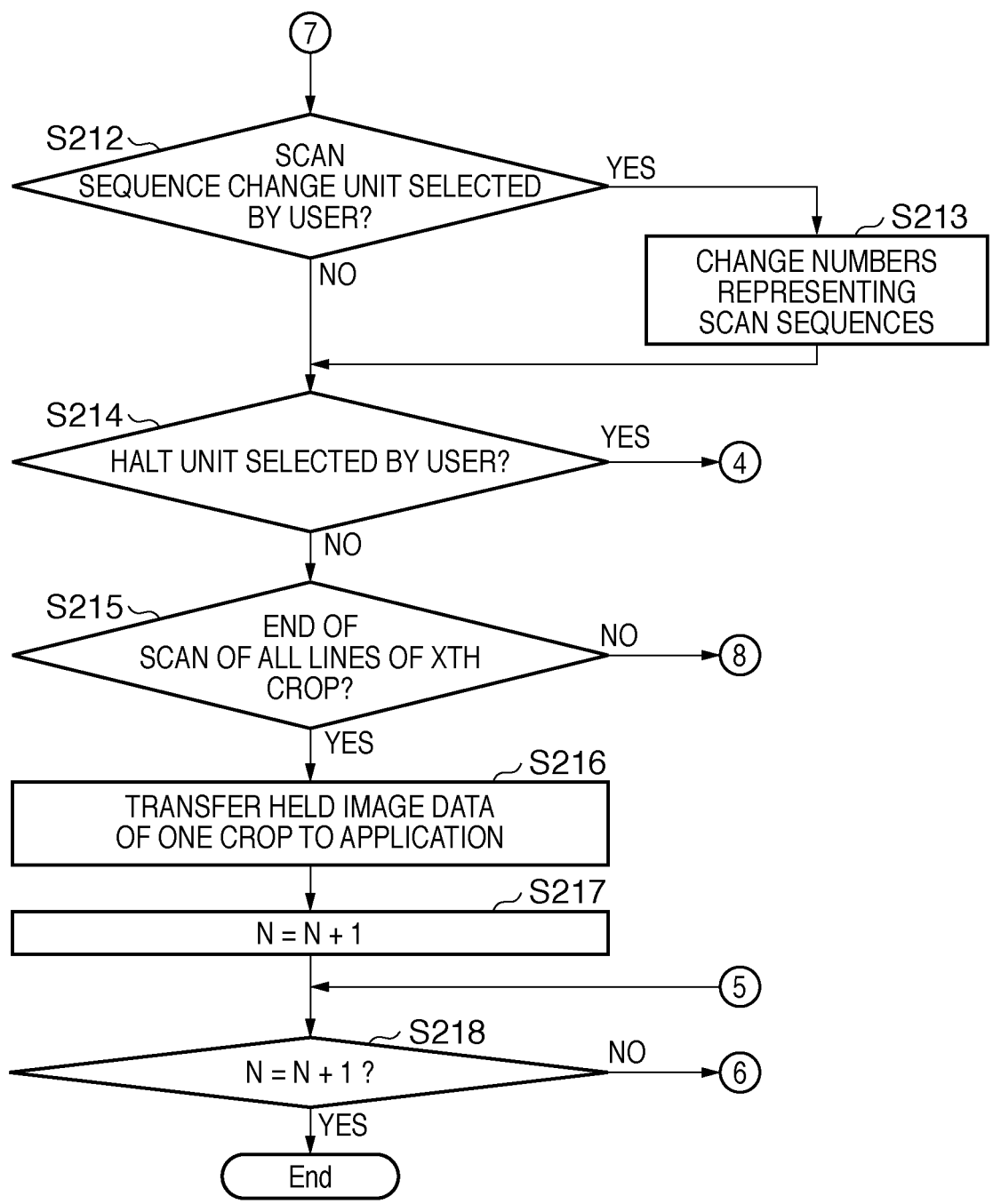

The image reading processing advances to the process shown in FIGS. 4A and 4B. At the start of main scan, X=1 is set first (S201) to start scan of the Xth crop (first crop at first) (S202). When the scan of the Xth crop ends, and the image data is transferred to the application, the value of X is incremented by one (S217). It is determined whether or not the incremented value of X equals (N+1) (S218). If X≠N+1, the process advances to scan of the next crop (S202). If X=N+1, the scan ends.

When the scan of the Xth crop starts (S202), the scanner driver 204 scans one line of the Xth crop (S203), and holds the obtained image data of one line (S204). Upon holding the image data of one line, the scanner driver 204 cancels the masking of the scanned line out of the regions masked gray on the preview image (S205). Although the masking is canceled on a line basis in this embodiment, the present invention is not limited to this. For example, the scanner driver 204 may compare the size of image data that is currently being received with the size of image data to be finally received for that crop, calculate the current percentage of the received image data, and cancel the masking by the percentage.

Figure 6:
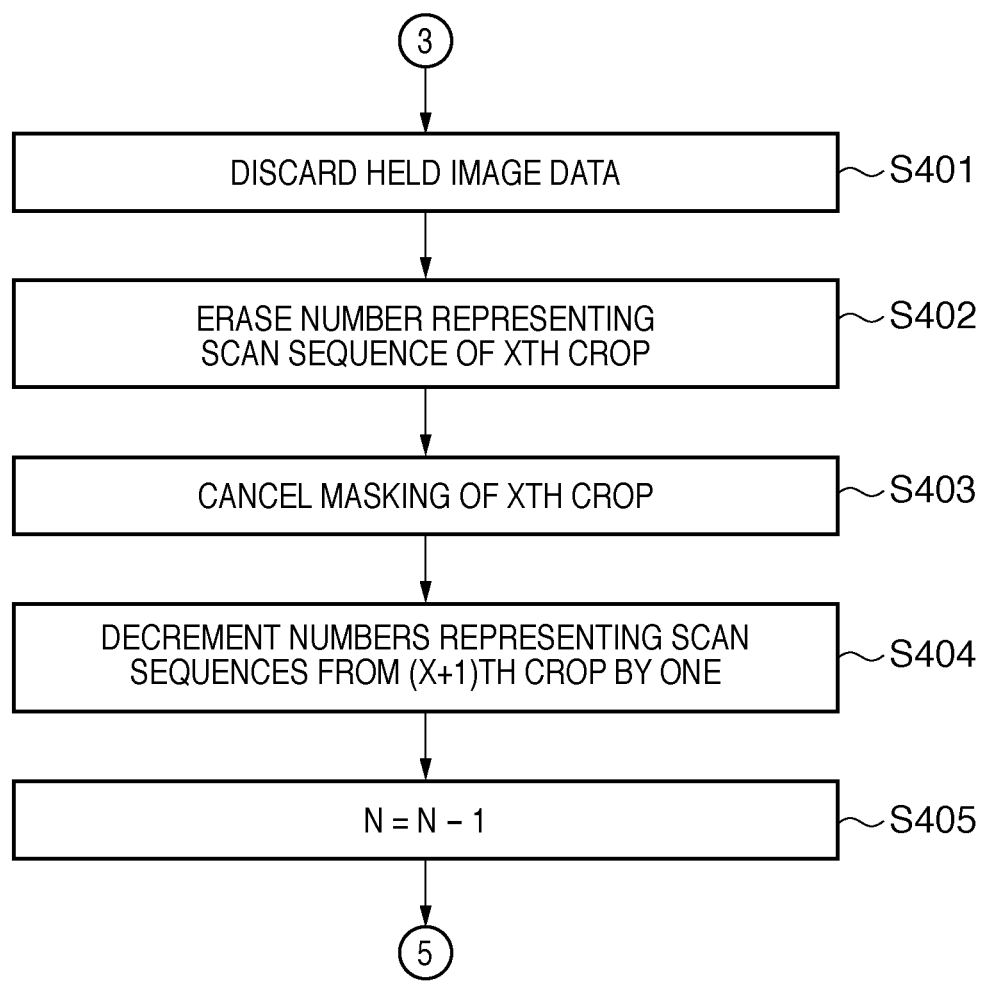
FIG. 6 is a flowchart illustrating processing when the first skip function is executed.
Figure 7:
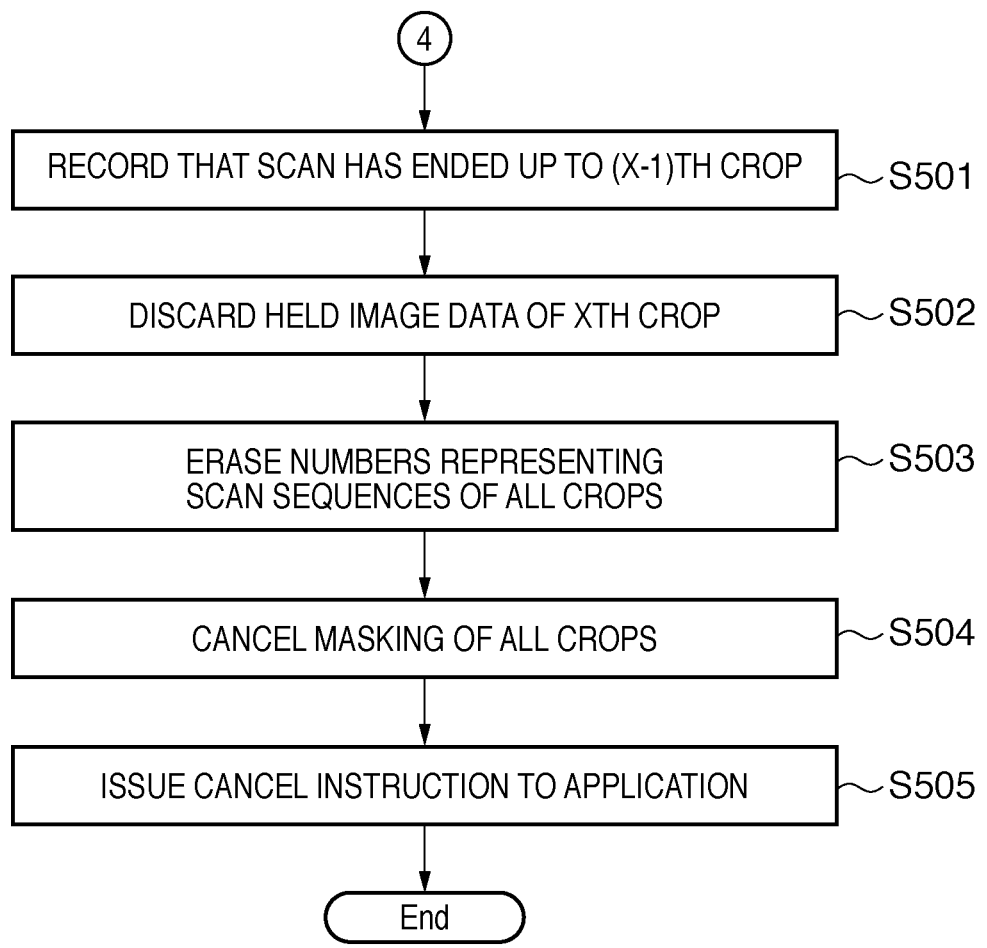
FIG. 7 is a flowchart illustrating processing when the halt function is executed.

After one line has been scanned during execution of main scan, the following processing is performed. More specifically, the scanner driver checks whether the user has input an instruction to select the whole cancel unit, the first skip unit, the second skip unit, the scan sequence change unit, or the halt unit (S206, S207, S208, S212, and S214). Upon receiving an instruction, the scanner driver performs processing corresponding to the instruction. More specifically, when the whole cancel unit is selected, the processing of the flowchart shown in FIG. 5 is executed. When the first skip unit is selected, the processing of the flowchart shown in FIG. 6 is executed. When the halt unit is selected, the processing of the flowchart shown in FIG. 7 is executed.

When the second skip unit is selected (S208), the number representing the scan sequence of the Yth (Y>X) crop that is the scan target disappears, and the numbers representing the scan sequences from the (Y+1)th crop are decremented by one (S209). The scanner driver cancels the masking of the Yth crop (S210), and decrements the total number N of crops to be scanned by one (S211). When the scan sequence change unit is selected and executed (S212), the numbers representing the scan sequences change (S213).

Processing when the whole cancel function is selected will be described next with reference to the flowchart of FIG. 5. When the function of the whole cancel unit is executed, the scanner driver discards the held image data (S301), and erases the numbers representing the scan sequences of all crops (S302). The scanner driver then cancels the masking of all crops (S303), and issues a cancel instruction to the application (S304).

Processing when the first skip unit is selected will be described next with reference to the flowchart of FIG. 6.

When the function of the first skip unit is executed, the scanner driver discards the held image data (S401), and erases the number representing the scan sequence of the Xth crop under scan (S402). The scanner driver then cancels the masking of the Xth crop (S403), and decrements the numbers representing the scan sequences from the (X+1)th crop by one and displays them (S404). At this time, the total number N of crops to be scanned is decremented by one to (N−1) (S405).

Processing when the halt unit is selected will be described next with reference to the flowchart of FIG. 7. When scan halt is executed, the scanner driver 204 stores information representing that the scan has ended up to the (X−1)th crop (S501), and discards the image data of the Xth crop under scan (S502). The scanner driver erases the numbers representing the scan sequences of all crops (S503), cancels the masking of all crops (S504), and issues a cancel instruction to the application (S505).

When being activated next time, the scanner driver 204 scans the Xth crop yet to be transferred to the application 203 while setting the sequence from 1. When the scanner driver 204 is activated, the scan may restart in this way. Alternatively, a restart button may be provided on the scanner driver 204, and the user may depress it to restart the scan.

After checking the presence/absence of selection of the whole cancel unit, the first or second skip unit, the scan sequence change unit, and the halt unit (S206, S207, S208, S212, and S214), the scanner driver 204 determines whether or not all lines of the Xth crop have been scanned (S215). If all lines have not been scanned yet, the process advances to scan of the next line (S203). If all lines have been scanned, the scanner driver determines whether or not the next crop exists (S218). If the next crop exists, the process advances to the next scan (S202). If the next crop does not exist, the scan ends.

Figure 9A:
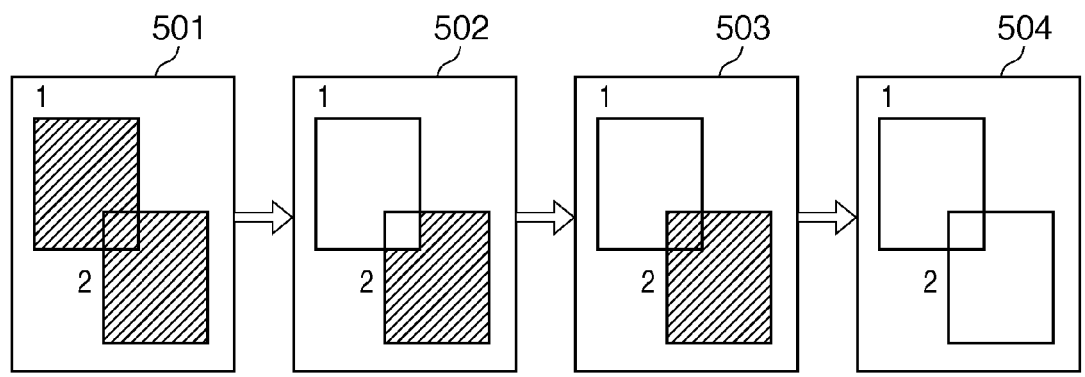
FIG. 9A is a view showing the progress of image reading when crops overlap.

FIG. 9A shows the change in the preview image when the crops overlap. Referring to FIG. 9A, reference numeral 501 indicates a state immediately after depressing the main scan button 305; 502, a state after the scan of the first crop; 503, a state before the start of scan of the second crop; and 504, a state at the end of scan of the second crop. Masking of the crop overlap portion is canceled after the scan of the first crop, as indicated by 502. The gray masking is applied again before the start of scan of the second crop, as indicated by 503. The gray masking is thus controlled to allow the user to grasp the progress of scan even when the crops overlap.

An example is described in which the scanner driver 204 cancels the gray masking sequentially from the portion whose image data has been received from the image reading apparatus. After having received the whole image data of the crop and canceled the whole masking in that crop, the scanner driver 204 needs time to process the image data or transfer it to the application 203.

Since the preview image does not change during this time, the image in the crop may blink on the preview screen to notify the user that the processing is being performed. Alternatively, a dedicated text box may be provided in the UI of the scanner driver 204 to notify the user that the processing is being performed. Otherwise, the gray masking may wholly be canceled not after the whole image data for the crop has been received but after the image processing and transfer, taking into consideration the image processing time or image data transfer time.

As described above, in the first embodiment, the gray masking of each crop is gradually canceled to indicate the progress of reading of each crop. Hence, the progress bar necessary in the conventional arts need not be displayed.

In this embodiment, the host includes the event processing unit 209 which processes an event corresponding to a user action for each crop received by the event reception unit 208. For example, click on a crop under scan enables to select and execute the whole cancel unit 210 or the first skip unit 211, and click on a crop yet to be scanned enables to select and execute the second skip unit 212. In addition, double click on a crop yet to be scanned enables to select and execute the scan sequence change unit 213, and triple click on a crop under scan enables to select and execute the halt unit 214. Which one of the whole cancel unit 210 and the first skip unit 211 is to be executed by click on a crop under scan can be changed by the user setting of the scanner driver 204. Note that no user action is accepted for a crop that has already undergone scan.

If one of crops of a crop overlap portion is currently undergoing scan, a user action such as click on that crop overlap portion is a user action for the crop which is being scanned. On the other hand, if none of the crops is currently undergoing scan, the user action is for the crop of the earliest scan sequence. When the user wishes to arbitrarily select a crop, he/she clicks while depressing a control key or the like of the keyboard 107, thereby freely selecting a crop and activating a user action.

Figure 9B:
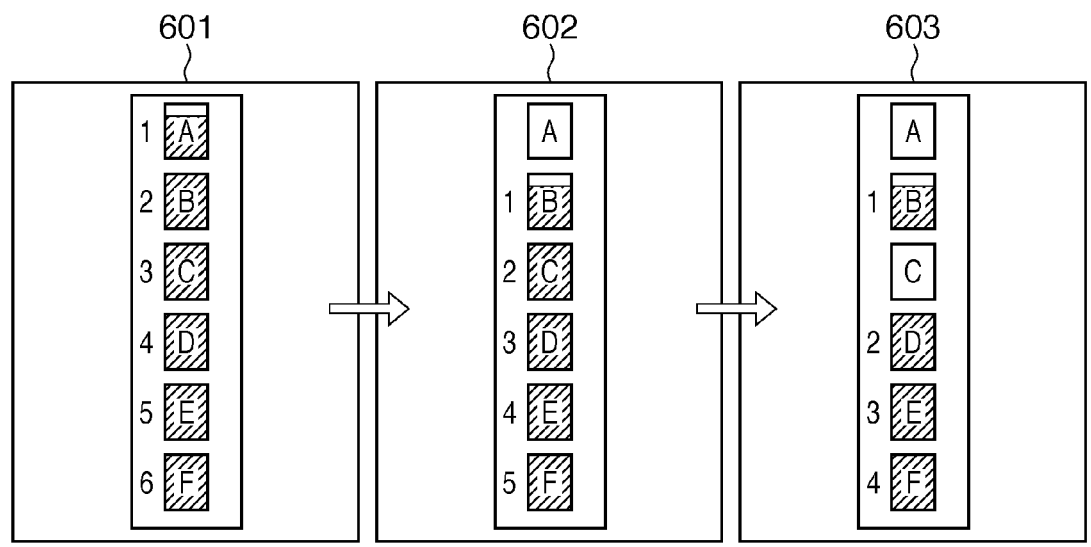
FIG. 9B is a view showing the change in the crop display when scan is skipped.

FIG. 9B is a view showing the progress of image reading when the first skip unit 211 and the second skip unit 212 are executed. Referring to FIG. 9B, reference numeral 601 indicates a state in which the frame A is being scanned; and 602, a state in which the user clicks on the crop of the frame A in the state 601.

When the user clicks on the frame A under scan, the subsequent scan may wholly be canceled by the whole cancel unit 210, or continued by the first skip unit 211. In this case, the user is assumed to have set the scanner driver 204 to execute the first skip unit by click on a crop under scan. Hence, after the scan of the frame A is canceled by selecting and executing the first skip unit 211, the processing advances to scan of the frame B. For this reason, as indicated by the state 602, since the frame A is canceled, the number representing the scan sequence of the frame A disappears, and the numbers of the frames B to F are decremented by one. The gray masking of the frame A is canceled.

Referring to FIG. 9B, reference numeral 603 indicates a state in which the frame C is clicked in the state 602. At this time, the frame C is excluded from the scan target by selecting and executing the second skip unit 212. The number of the frame C disappears, and the numbers of the frames D to F are decremented by one. The gray masking of the frame C is canceled.

As described above, selecting and executing the first skip unit 211 and the second skip unit 212 make it possible to cancel scan of a specific crop and continuously scan the remaining crops after depressing the main scan button 305. For example, in film scan, a plurality of crops exist, and reading of each crop with a high resolution takes time in many cases. Hence, if there is a crop that need not be scanned, it is desirable to skip only that crop even after depressing the main scan button 305. If two crops of similar images exist, one of the crops can be skipped with the skip function, whereas only the other crop can be scanned using the skip function. Alternatively, scan of images of failed image capturing and the like can be skipped.

As described above, according to the first embodiment, a specific crop can be selected and canceled even after depressing the main scan button, although it is conventionally difficult to designate and cancel a specific crop because the user cannot identify which crop is being scanned.

In the above description, the image reading target medium is applied to a transparent original such as a film. However, the present invention is also applicable to a reflection original.

In a reflection original, a crop unintended by the user may be generated and scanned. A crop unintended by the user is, for example, a crop generated by unconsciously dragging the pointing device 108 on the preview screen due to user's operation error, or a crop erroneously detected by the original detection function of the scanner driver 204. If the region of such a crop unintended by the user is large, he/she can be aware of the crop and exclude it from the scan target before the main scan. However, if the crop region is small, the user is often unaware of it before main scan. Such a crop unintended by the user may be found after the start of main scan. Hence, the user is desirably able to skip the crop even after the main scan.

In the first embodiment, however, the user can designate and skip a crop using the second skip unit even after depressing the main scan button. It is therefore possible to skip a crop unintended by the user. Additionally, in the first embodiment, since the progress bar need not be displayed, the crop unintended by the user is never hidden by the progress bar, and the user can easily find this type of crop.

In the first embodiment, the scan sequence change unit 213 enables to change the scan sequence by double click on a crop yet to be scanned. For example, when there are character-based originals and photo originals, the scan sequences of the plurality of crops can be changed to scan all character-based originals and transfer them to the application 203 and then scan all photo originals and transfer them to the application 203.

In addition, when originals of a plurality of types such as character-based originals and photo originals exist, using the scan sequence change unit 213 and the halt unit 214 enables to transfer the character-based originals to an OCR application and the photo originals to an image editing application.

In this case, the scanner driver 204 is activated from the OCR application to generate the crop frames of the character-based originals and the photo originals and start main scan. After the start of main scan, the sequences are changed using the scan sequence change function to scan the character-based originals first so that all character-based originals are scanned and transferred to the OCR application. When all character-based originals have been scanned and transferred, and the first photo image is being scanned, the user triple-clicks on the crop of the first photo image. The halt unit 214 thus cancels the crops to be scanned subsequently including the crop under scan, and the scanner driver 204 ends.

At this time, the scanner driver 204 stores, as a history, the crops yet to be transferred to the OCR application. Next, the user activates the image editing application and activates the scanner driver 204. At this time, the scanner driver 204 sequences the crops yet to be transferred to the OCR application from 1 and displays them by referring to the preceding history. On the other hand, the crops that have already been transferred to the application are not displayed on the preview screen as crops. When main scan starts in this state, all photo originals are scanned, and their image data are transferred to the image editing application.

As described above, according to the first embodiment, even when both character-based originals and photo originals exist, using the function of the halt unit 214 allows to transfer them to different applications. Note that the scanner driver 204 is temporarily ended by the halt unit 214 and activated again by another application here. Instead of terminating the scanner driver 204, the scan may be restarted from the same application 203.

[Second Embodiment]

In the first embodiment, the progress is expressed using regions in crop frames. An example will be described here in which the progress of image reading is expressed using crop frames.

Figure 10:
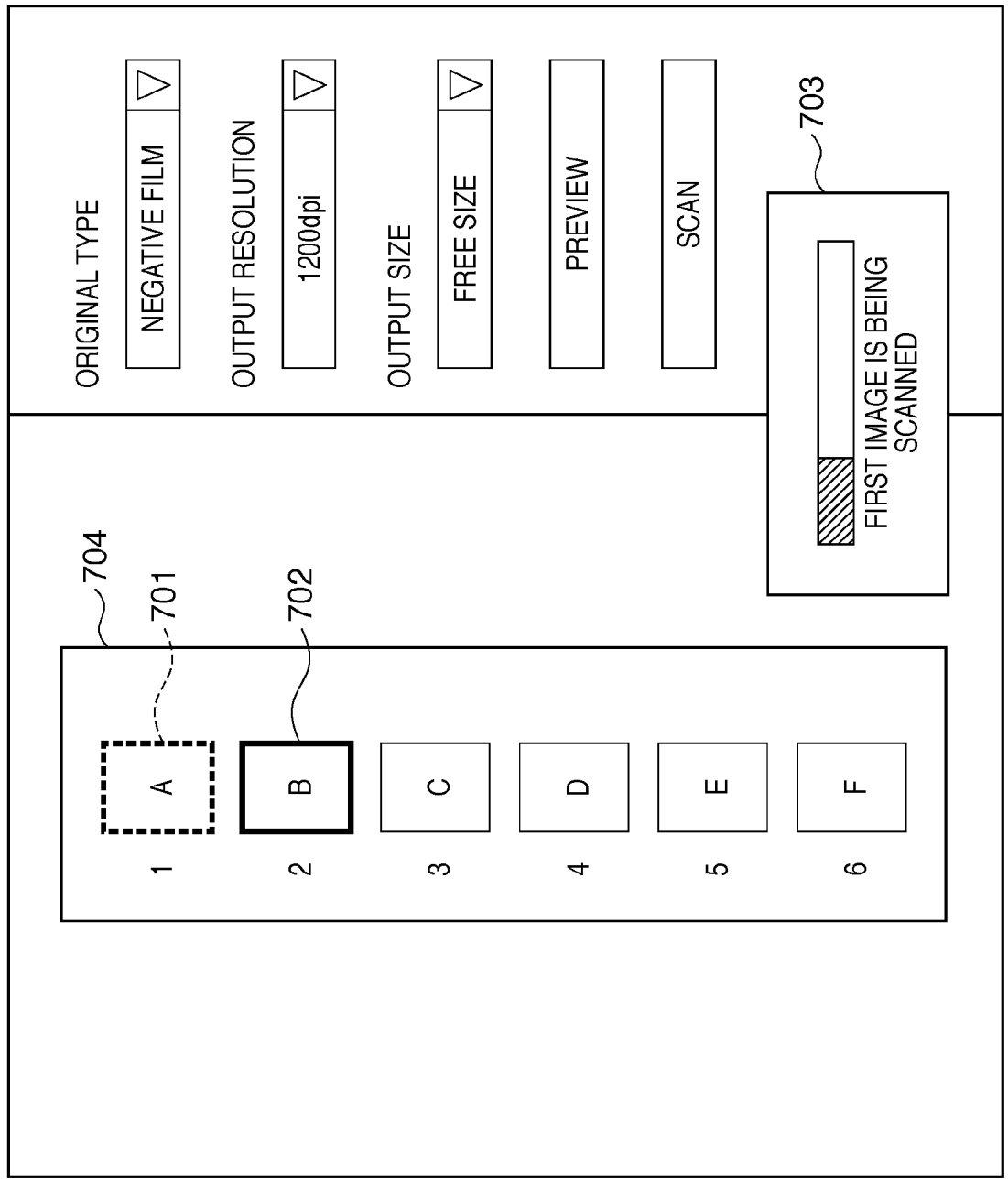
FIG. 10 is a view expressing the progress using crop frames to which the present invention is applicable.

FIG. 10 is a view showing the progress of image reading according to the second embodiment. Referring to FIG. 10, a bold dotted line 701 expresses a crop frame currently under scan, and a bold line 702 expresses a crop frame to be scanned next. In FIG. 10, a frame A is being scanned. the crop frame of the frame A is indicated by the bold dotted line 701, and that of a frame B to be scanned next is indicated by the bold line 702. In this state, the user cannot grasp the progress of the crop under scan. Hence, in the second embodiment, a progress bar 703 representing the progress of the crop under scan is displayed, as shown in FIG. 10. In this case, if the progress bar 703 overlaps a crop frame, the user cannot visually grasp the crop under scan or the crop to be scanned next. Hence, the display region of the progress bar 703 is controlled not to overlap a preview region 704.

Note that in the example shown in FIG. 10, the progress bar 703 is displayed on a separate dialogue. However, a certain region may be provided in the UI of the scanner driver 204 to display the progress bar. Alternatively, the user may be notified of the progress by gradually changing the crop frame display by, for example, displaying one side of the crop frame like the progress bar.

Even when the progress is presented using crop frames as described above, a user action such as click or double click on a crop enables whole cancel, skip, sequence change, or scan halt, as described in the first embodiment.

Note that in the above-described embodiments, the arrangement in which the scanner driver is installed in the host and executed has been exemplified. However, the present invention is not limited to this. For example, the image reading apparatus may be integrated into an MFP (Multi Function Printer) including a printer unit, a scanner unit, and a monitor unit, and the scanner driver having the above-described functions may be installed in the MFP. In this case, the progress of scan can be presented on the display panel or the like of the MFP so as to perform each operation on the MFP.

In addition, the present invention is also implemented by executing the following processing. That is, software (program) that implements the functions of the above-described embodiments is supplied to the system or apparatus via a network or various kinds of storage media, and the computer (or CPU or MPU) of the system or apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-158262, filed Jul. 12, 2010, which is hereby incorporated by reference herein in its entirety.

What is claimed is:

1. A scanning method comprising:
    performing first scanning of at least one original by a scanning apparatus;
    displaying a plurality of crop areas on a screen by specifying, from an image obtained from the first scanning of the at least one original, the plurality of crop areas corresponding to a scanning target area for a second scan;
    performing second scanning of the plurality of crop areas sequentially by the scanning apparatus; and controlling to change a state of display of a crop area on the screen under scan by the second scanning, for visual distinctness from a crop area, which has been scanned by the second scanning or to be scanned by the second scanning, among the plurality of crop areas, in accordance with progress of sequential scanning of the plurality of crop areas by the second scanning.

2. The method according to claim 1, wherein the image obtained from the first scanning is displayed so as to indicate the plurality of crop areas in the image.

3. The method according to claim 1, further comprising:
receiving a user instruction for reading of the image corresponding to the plurality of crop areas during execution of the second scanning; and
changing an image reading operation by the second scanning in accordance with the instruction received in the receiving the user instruction.

4. The method according to claim 1, wherein the displaying includes displaying a number representing an image reading sequence for the plurality of crop areas.

5. The method according to claim 3, wherein in the changing an image reading operation, the image reading operation includes at least one of:
cancel that cancels image reading of one crop area under scan and cancels image reading of one or more subsequent crop areas;
first skip that cancels image reading of one crop area under scan and continues image reading of one or more subsequent crop areas;
second skip that excludes one or more crop areas yet to be scanned from a scan target for image reading;
sequence change that changes a scan sequence of crop areas yet to be scanned for image reading; and
halt that cancels image reading of one crop area under scan and one or more subsequent crop areas and, upon next reading, controls the one crop area under scan and the one or more subsequent crop areas to be scanned.

6. A non-transitory computer-readable storage medium storing a computer-executable program, the computer-executable program comprising:
processing to control a scanning apparatus to perform a first scan of at least one original;
processing to control a display apparatus to display a plurality of crop areas on a screen by specifying, from an image obtaining from the first scanning of the at least one original, the plurality of crop areas corresponding to a scanning target area for a second scan and;
processing to control the scanning apparatus to perform a second scan of the plurality of crop areas sequentially; and
processing to control the display apparatus to change a state of display of a crop area under scan on the screen for visual distinctness from a crop area, which has been scanned by the second scan or to be scanned by the second scan, among the plurality of crop areas, in accordance with progress of sequential scanning of the plurality of crop areas by the second scan.

7. An apparatus comprising:
a first scan control unit configured to control a scanning apparatus to perform a first scan of at least one original;
a display control unit configured to control a display apparatus to display a plurality of crop areas on a screen by specifying, from an image obtained from the first scanning of the at least one original in the scanning apparatus, the plurality of crop areas corresponding to a scanning target area for a second scan; and
a second scan control unit configured to control the scanning apparatus to perform a second scan of the plurality of crop areas sequentially; and
a control unit configured to control the display apparatus to change a state of display of a crop area under scan on the screen for visual distinctness from a crop area, which has been scanned by the second scan or to be scanned by the second scanned, among the plurality of crop areas, in accordance with progress of sequential scanning of the plurality of crop areas by the second scan.

8. The method according to according to claim 1, wherein a change of a state of display is performed in accordance with completion of the second scanning corresponding to each of the plurality of crop areas.

9. The method according to claim 8, wherein a crop area serving as a target for changing the state of display is switched in accordance with the completion of the second scanning corresponding to each of the plurality of crop areas.

10. The method according to claim 1, wherein a color of at least one crop area among the plurality of crop areas on the screen is changed as a change of a state of display.

11. The apparatus according to claim 7, wherein the image obtained from the first scan is displayed so as to indicate the plurality of crop areas in the image.

12. The apparatus according to claim 7, further comprising:
a reception unit configured to receive a user instruction for reading of the image corresponding to the plurality of crop areas during execution of the second scan; and
a read control unit configured to change an image reading operation by the second scan in accordance with the user instruction received by the reception unit.

13. The apparatus according to claim 7, wherein the display includes displaying a number representing an image reading sequence for the plurality of crop areas.

14. The apparatus according to claim 13, wherein the image reading operation changed by the read control unit includes at least one of:
cancel that cancels image reading of one crop area under scan and cancels image reading of one or more subsequent crop areas;
first skip that cancels image reading of one crop area under scan and continues image reading of one or more subsequent crop areas;
second skip that excludes one or more crop areas yet to be scanned from a scan target for image reading;
sequence change that changes a scan sequence of crop areas yet to be scanned for image reading; and
halt that cancels image reading of one crop area under scan and one or more subsequent crop areas and, upon next reading, controls the one crop area under scan and the one or more subsequent crop areas to be scanned.

15. The apparatus according to according to claim 7, wherein a change of a state of display is performed in accordance with completion of the second scan corresponding to each of the plurality of crop areas.

16. The apparatus according to claim 15, wherein a crop area serving as a target for changing the state of display is switched in accordance with the completion of the second scan corresponding to each of the plurality of crop areas.

17. The apparatus according to claim 7, wherein a color of at least one crop area among the plurality of crop areas on the screen is changed as a change of a state of display.

18. The method according to claim 1, wherein the controlling includes changing a state of display of a crop area, which has been scanned or to be scanned next, among the plurality of crop areas.

19. The method according to claim 1, wherein in the controlling, the state of display of a crop area under scan is changed so as to indicate part, of the crop area under scan, which has been scanned.

20. The method according to claim 1, wherein in the controlling to change a state of display of a crop area under scan, the crop area which has been scanned by the second scanning and the crop area to be scanned by the second scanning are distinctively displayed from each other.

* * * * *